Aug. 22, 1933.   C. F. CODA   1,923,477
MACHINE FOR SERRATING TUBES AND THE LIKE
Filed Feb. 27, 1929   2 Sheets-Sheet 1
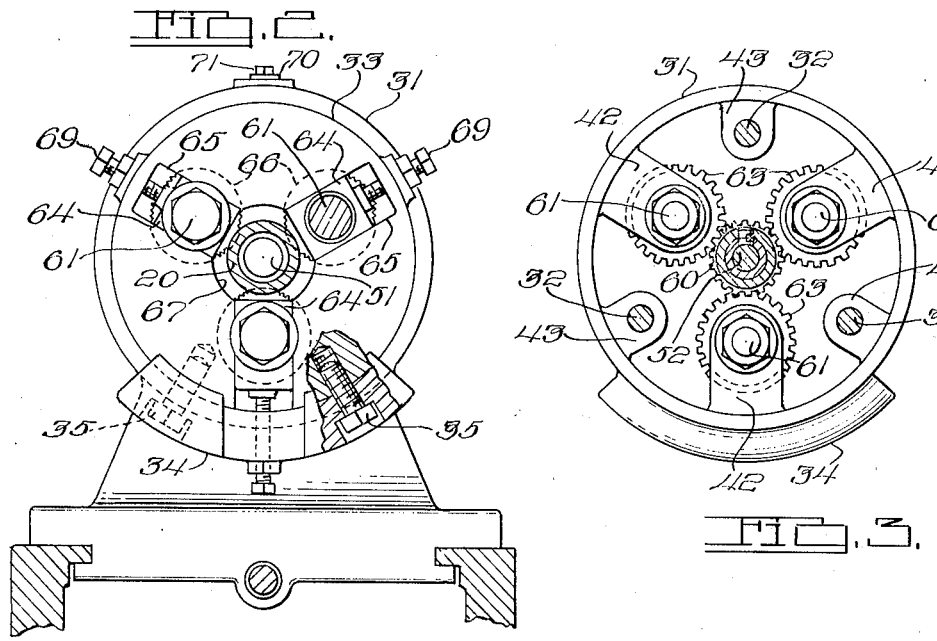
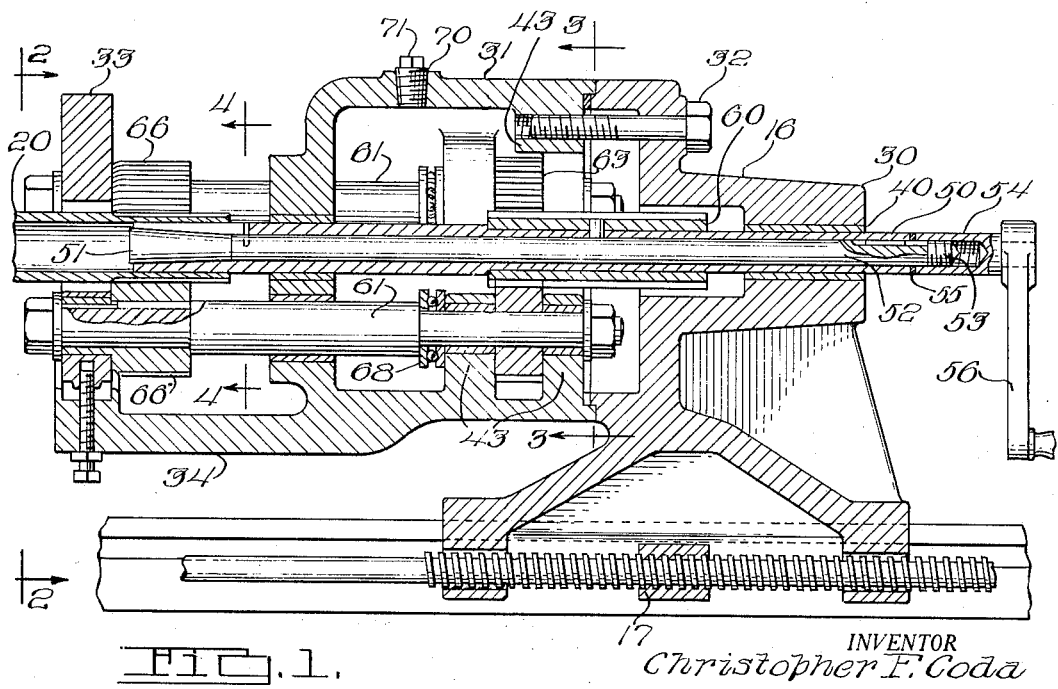
INVENTOR
Christopher F. Coda
BY
Harness, Dickey & Pierce
ATTORNEYS.

Aug. 22, 1933.  C. F. CODA  1,923,477
MACHINE FOR SERRATING TUBES AND THE LIKE
Filed Feb. 27, 1929  2 Sheets-Sheet 2
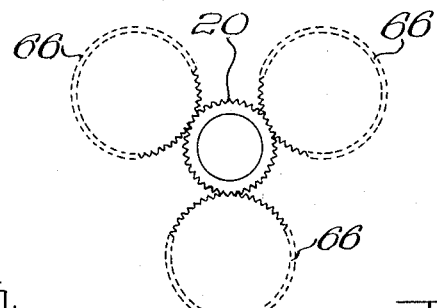
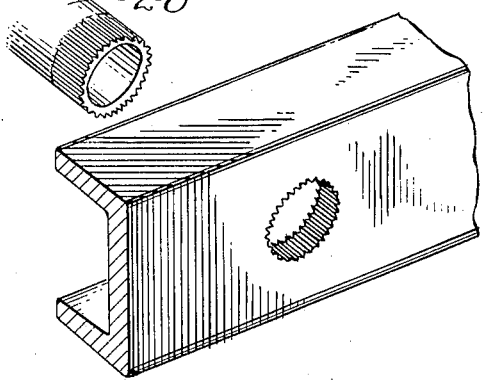
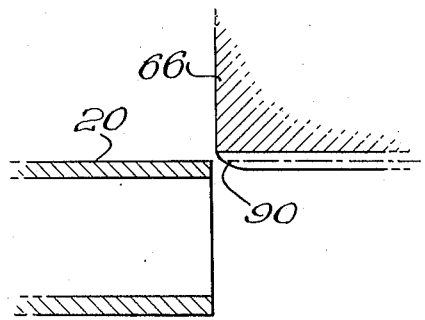
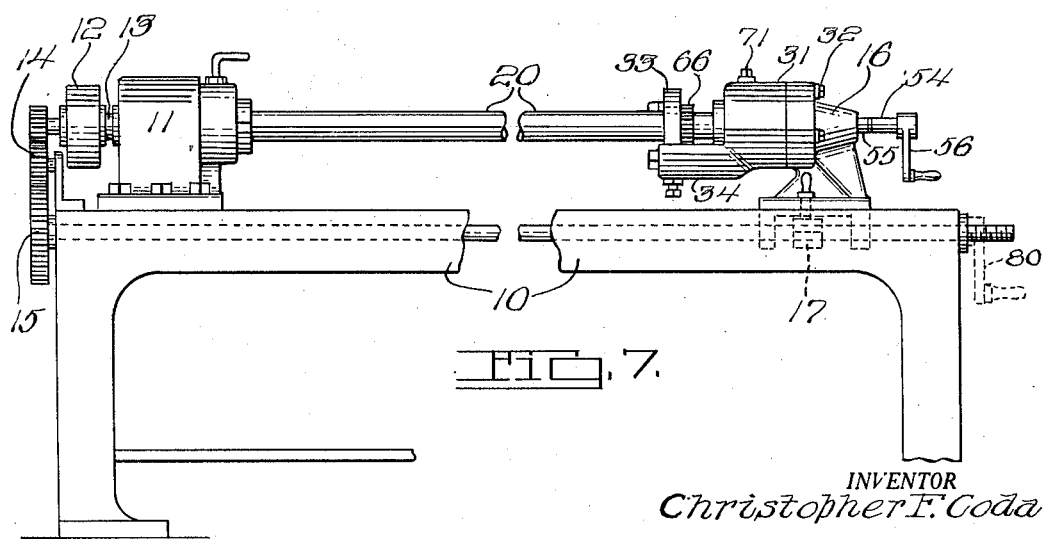
INVENTOR
Christopher F. Coda
BY
Harness, Dickey & Pierce
ATTORNEYS.

Patented Aug. 22, 1933

1,923,477

UNITED STATES PATENT OFFICE 1,923,477

MACHINE FOR SERRATING TUBES AND THE LIKE

Christopher F. Coda, Detroit, Mich.

Application February 27, 1929. Serial No. 343,046

10 Claims. (Cl. 80—5.1)

The principal object of my invention is to provide a machine which may be relied upon to automatically form a given number of serrations on a tube, or like article.

One of the principal methods of joining a member in the nature of a shaft to a member in the nature of a hub so that there can be no rotation of one relative to the other, is by means of what is known as a serrated fitting. In other words, the hub is provided with internal serrations and the shaft is provided with external serrations, both of which are in the form of teeth and which interlock with one another, and when tightly pressed together, form a very tight and lasting joint.

The serrations are ordinarily formed in the hub member by means of a broach or punch which forms a given number of serrations of a given size, and the serrations are then formed on the shaft to match or correspond with the serrations in the hub. The serrations are formed in the shaft usually by milling or hobbing. Hobbing cheap parts is so expensive as to be prohibitory. Milling is as expensive and less accurate.

The machine I have provided may be set to automatically form a predetermined number of serrations in the tube or shaft without the necessity of readjustment of the serrating means for each piece of work, and without the necessity of adjustment during the progress of the work on any single piece. It has been found to reduce the cost of production to a very material extent. For instance, the side members of chassis frames are joined together by cross tubes. The ends of the tubes are serrated to fit and are then pressed into serrated openings in the frame members. The best prices obtainable for serrating both ends of a tube has heretofore been in the neighborhood of ninety cents. With my machine the cost has been reduced to twelve cents.

With the above and other objects in view, my invention consists in the arrangement, combination and construction of the various parts of my improved machine as described in the specification, claimed in my claims, and shown in the accompanying drawings, in which:

Fig. 1 is a vertical sectional view taken longitudinally of my machine.

Fig. 2 is a view taken on the line 2—2 of Fig. 1.

Fig. 3 is a view taken on the line 3—3 of Fig. 1.

Fig. 4 is a diagrammatic cross sectional view illustrating the position of the cutting members relative to the tube to be serrated.

Fig. 5 is a perspective of a fragment of a side frame member of an automobile chassis end the end of a cross tube, illustrating the serrations in the aperture of the frame member and the serrations upon the tube which are designed to interlock.

Fig. 6 is a diagrammatic illustration illustrating the form of the serrated teeth on the cutters, and their manner of approach to the tube.

Fig. 7 is a diagrammatic illustration of my machine mounted upon a lathe table.

Referring to Fig. 7, the numeral 10 indicates the lathe table. The numeral 11 indicates any conventional mechanism for holding and rotating the tube. 12 indicates a pulley which is attached to a shaft 13 by means of which power is transmitted to the rotating mechanism. 14 indicates generally a gear train by means of which power is taken from the shaft 13 and transmitted to the screw shaft 15 which engages the slidable head member designated generally as 16 by means of a conventional split nut arrangement 17 and by means of which the head 16 is slidably reciprocated on the table 10 relative to the rotating mechanism 11. The gear train 14 includes an idler gear which may be changed to regulate the speed of the shaft 15 and consequently, the rate at which the slidable head 16 moves on the table 10. A tube, designated by the numeral 20 is secured at one end in the rotating mechanism 11 with the end of the tube to be serrated extending toward the slidable head 16.

Referring now to Fig. 1, the numeral 16 indicates generally a slidable head or housing member which carries the serrating mechanism. This member is composed of three separable parts; the hub part 30 to which the slidable base is secured, an intermediate housing part 31 which is secured to the hub part 30 by means of the bolts 32 such as shown, and the guide part 33 which rests upon and is secured to an extension 34 of the housing part 31 by means of bolts 35 shown in Fig. 2. The part 31, which is circular in cross section, is provided with three inwardly extending lugs 43 adjacent its rear end, which are internally threaded to receive the threaded ends of the bolts 32 by means of which the member 31 is secured to the member 30. The meeting edges of the members 30 and 31 are shouldered to lap and inter-lock, as shown. The forward end of the member 31 is closed, with the exception of four apertures therein through which the various shafts for operating the cutters and the arbor extend. Suitable bushings are provided in the apertures and provide supporting bearings for the various shafts and arbor. An integral forwardly extending apron 34 is formed on the under side of the member 31 and on its forward end supports the guide member 33 in spaced relation to the end of the member 31. The hub member 30 is provided with a central longitudinal bore 40 which is enlarged in its forward portion as shown. Journalled in the central bore 40 of the hub member 30 is a hollow arbor 50 which extends to the rear of the hub member 30 and also forwardly and centrally through and beyond the forward end of the casing 31. The forward end of the arbor is longitudinally split and a tapered plug 51 is slidably fitted therein and connected to a rod 52, which extends through the hollow arbor and beyond the rear end thereof. The rear of the rod 52 is threaded as at 53 and an internally threaded sleeve 54 engages the threaded end of the rod 53 and bears against the end of the arbor 50 at 55. A crank 56 is secured to the end of the sleeve 54 whereby the sleeve 54 may be turned on the threaded end of the rod 52 to pull the tapered plug 51 into the split forward end of the arbor 50 and expand it to engage the inside of the tube 20. Slidably keyed to the intermediate portion of the arbor 50 is a gear 60. The housing part 31 is provided with three pairs of inwardly extending ears 42 as shown in Figs. 1 and 3. Shafts 61, of which there are three, are journaled one in each pair of ears 42, and secured to each shaft between each pair of ears 42 is a gear 63, each of which mesh with the gear 60. The shafts 61 extend forwardly through the housing member 31 and are journalled in the front wall of the housing member and have their forward ends journalled in blocks 64, which are slidable in radial slots 65 formed in the guide part 33. Keyed to each shaft 61 immediately in the rear of the guide part 33 are serrating cutters 66 adapted to form the desired serrations in the surface of the tube 20. The guide part 33 is provided with a central opening 67 through which the end of the tube 20 may be inserted to engage with the cutters 66.

It is preferable to key the gears 63 slidably upon the shafts 61 and to provide each shaft 61 with a ball thrust bearing 68 immediately forward of the ears 42. This will prevent a tendency of the gears 63 to bind against the ears 42, which might be caused by the rearward thrust of the shafts 61 when the cutters 66 engage the tube 20. The ball thrust bearing will relieve the friction of the shoulders on the shafts 61 against the ears 42 when the thrust is taken. Set screws 69 are provided in the edge of the guide member 33 opposite the slots 65 and bear against the slidable blocks 64 in which the ends of the shafts 61 are journalled, which may be turned to correct and adjust the position of the cutters relative to the tube. An oil aperture 70 is provided in the top portion of the housing 31 and a screw plug 71 may be used for closing the same. The housing 31 may be filled with oil in order to provide adequate lubrication for the gears and bearings contained therein.

If desired, the shaft 15 by means of which the slidable member 16 is reciprocated relative to the rotating mechanism 11, may be disconnected from the gear train 14 and a hand crank 80 secured to the rear end thereof for turning the same.

In operation, one end of the tube 20 is secured in a chuck attached to the rotating mechanism 11, the other end extending toward the serrating head 16. The serrating head 16 is moved toward the end of the tube until the free end of the tube is adjacent the central opening 67 in the guide member 33. The arbor 50 is then pushed forward until its split end extends beyond the ends of the cutters 66 and is inserted in the end of the tube 20, and the tapered plug 51 is then tightened by means of the rod 52, the sleeve 54, and crank 56 to expand the end of the arbor tightly within the tube, so that the rotary movement of the tube will be transmitted to the arbor. The rotating mechanism 11 is then started, causing the tube 20 to rotate, and the serrating member is moved forwardly, bringing the end of the tube into contact with the forward ends of the cutters 66 and progressing until the desired serrations are formed on the end of the tube. The cutters 66 are driven independently of their contact with the tube, by means of the arbor 50, the gears 60 and gears 63 and the shafts 61.

It is also necessary that the pitch line of the gears 60—63 be a continuation of the pitch line of the serrations to be formed in the tube 20, and the pitch line of the serrating cutters 66 must necessarily coincide with the pitch line of the serrated tube. This is necessary in order to maintain the peripheral speed of the rotating cutters at the pitch line identical with the peripheral speed of the tube at the pitch line of the serrations. Given three cutters carrying serrations of the size desired to be reproduced on the tube, and positively driving the same at the speed of the tube, the same number of serrations will be formed upon any tube of the same or substantially the same size which is put through the machine.

It is, of course, possible to form the serrations with one or more cutters, so long as the same are positively driven at the same angular velocity as the tube. It has been found, however, that the use of three cutters, positioned as shown, is quite satisfactory, as they equalize the pressure on the tube and form the serrations with sufficient rapidity for the purpose of production.

It has also been found desirable to bevel the forward ends of the cutter blades as shown at 90 in Fig. 6, in order to eliminate chipping as the cutters engage the tube, and to provide for a gradual deepening of the cut as the teeth advance, which relieves the strain on the shafts 61 and on the cutter teeth.

Formal changes may be made in the specific embodiment of the invention described without departing from the spirit or substance of the broad invention, the scope of which is commensurate with the appended claims.

What I claim is:

1. A machine for forming longitudinal serrations in the perimetral surface of a circular work piece, comprising means for rotating said work piece, rotatable serration forming means positioned to engage said work piece, a support for said forming means, an arbor carried by said support and adapted to engage and be rotated by said work piece, and means connecting said arbor and said forming means adapted to transmit the identical peripheral speed of that portion of the work piece to be serrated to said serration forming means.

2. A machine for forming longitudinal serrations in the perimetral surface of a circular work piece, comprising means for rotating said work piece, rotatable longitudinally serrated cutters positioned to engage and form serrations in the surface of said work piece, a slidable support for said cutters, an arbor carried by said support adapted to engage and be rotated by said work piece, a shaft for each of said cutters journalled in said support, a gear on said arbor, a gear on each of said shafts engaging the gear on said arbor, the pitch line of the gears on said shafts and arbor coinciding with a continuation of the common pitch lines between said cutters and work piece whereby said cutters are driven at the same angular velocity as said work piece.

3. A machine for forming longitudinal serrations in the perimetral surface of a cylindrical tube, comprising means for rotating said tube, a sliding member reciprocable relative to the end of said tube, an arbor slidable in said member, means for securing said arbor in the end of said tube for rotation therewith, a gear on said arbor, a plurality of shafts journalled in said slidable member, a gear on each of said shafts engaging said gear on said arbor at pitch lines coinciding with a continuation of the pitch lines of the serrations to be formed in said tube, and serrated cutters secured to said shafts and positioned to engage said tube and form serrations in the surface thereof.

4. A machine for forming longitudinal serrations in the perimetral surface of a circular work piece, comprising means for rotating said work piece, a serrated cutter positioned to rotate with and engage the surface of said work piece, gear means for positively rotating said cutter, and interconnecting means between said work piece and said gear means to have the gear means actuated by the rotation of said work piece to cause the cutter and work piece to rotate in synchronism.

5. A machine for forming longitudinal serrations in the surface of a circular work piece including, in combination, means for rotating said work piece, rotatable serration forming means positioned to engage the surface of said work piece, driving means for said forming means, and a connection between said rotating work piece and said driving means for rotating said former means independent of engagement with said work piece.

6. A device for machining a tubular work piece including, in combination, means for engaging and driving one end of said work piece, an expanding element engaging the inner surface of the other end of said work piece, a rotatable tool, and driving means for said tool actuatably connected to said expanding element.

7. A device for machining a tube including, in combination, means for engaging and driving one end of said tube, an expanding element engaging the inner surface of the other end of said tube, a rotatable tool, driving means for said tool actuatably connected to said expanding element, and means for relatively moving the tube and tool axially.

8. A device for machining a tube including, in combination, means for engaging and driving one end of said tube, an expanding element engaging the inner surface of the other end of said tube, a plurality of rotatable tools, and driving means for said plurality of tools actuatably connected to said expanding element.

9. A device for machining a tubular work piece including, in combination, means for engaging and driving one end of said work piece, an expanding element engaging the inner surface of the other end of said work piece, rotatable serrating tools, driving means for said tools, and a connection between said driving means and said expanding element.

10. A device for machining a tubular work piece including, in combination, means for engaging and driving one end of said work piece, an expanding element engaging the inner surface of the other end of said work piece, rotatable serrating tools, driving means for said tools, connecting means between said driving means and said expanding element, and means for effecting a relative movement between the work piece and the tool relative to the axis of said work piece.

CHRISTOPHER F. CODA.